(12) United States Patent
Ito et al.

(10) Patent No.: US 11,190,696 B2
(45) Date of Patent: Nov. 30, 2021

(54) ELECTRONIC DEVICE CAPABLE OF REMOTELY CONTROLLING IMAGE CAPTURE APPARATUS AND CONTROL METHOD FOR SAME

(71) Applicant: CANON KABUSHIKI KAISHA, Tokyo (JP)

(72) Inventors: Katsuhiro Ito, Yokohama (JP); Katsuhito Yoshio, Tokyo (JP); Harry Vermeulen, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/003,050

(22) Filed: Aug. 26, 2020

(65) Prior Publication Data

US 2021/0067707 A1 Mar. 4, 2021

(30) Foreign Application Priority Data

Aug. 30, 2019 (JP) .............................. JP2019-158935

(51) Int. Cl.
*H04N 5/232* (2006.01)
*H04N 5/225* (2006.01)

(52) U.S. Cl.
CPC ... *H04N 5/232933* (2018.08); *H04N 5/23203* (2013.01); *H04N 5/23296* (2013.01); *H04N 5/232939* (2018.08)

(58) Field of Classification Search
CPC ....... H04N 5/232933; H04N 5/232939; H04N 5/23296; H04N 5/23203; H04N 5/23293; H04N 5/23238; H04N 5/23206; H04N 5/232945; H04N 5/23299; H04N 5/23216; H04N 5/2251; H04N 5/2254; H04N 5/2253
USPC .................................................. 348/143–159
See application file for complete search history.

(56) References Cited

U.S. PATENT DOCUMENTS

| 4,855,782 A * | 8/1989 | Kobayashi ............. G03B 17/18 396/88 |
| 6,760,063 B1 * | 7/2004 | Kamei ............... H04N 5/23238 348/143 |
| 2002/0067412 A1 * | 6/2002 | Kawai ............... H04N 5/23299 348/211.99 |

(Continued)

FOREIGN PATENT DOCUMENTS

JP 3839881 B2 11/2006

OTHER PUBLICATIONS

The above document was cited in a Sep. 14, 2021 Chinese Office Action, which is enclosed without an English Translation, that issued in Chinese Patent Application No. 202010896933.9.

*Primary Examiner* — Albert H Cutler
(74) *Attorney, Agent, or Firm* — Cowan, Liebowitz & Latman, P.C.

(57) ABSTRACT

An electronic device displays an operation screen for remotely adjusting a field of view (FOV) of an external image capture apparatus. The operation screen comprises a field-of-view user interface (FOV-UI) that includes an indication of a current field of view of the image capture apparatus and an indication of a maximum field of view at a current orientation of the image capture apparatus. The electronic device updates the FOV-UI based on information acquired from the image capture apparatus.

13 Claims, 14 Drawing Sheets

(56) References Cited

U.S. PATENT DOCUMENTS

| | | | | |
|---|---|---|---|---|
| 2006/0008175 A1* | 1/2006 | Tanaka | H04N 7/181 | 382/276 |
| 2010/0321495 A1* | 12/2010 | Oya | G01S 3/7864 | 348/143 |
| 2011/0116165 A1* | 5/2011 | Suzuki | G02B 21/002 | 359/388 |
| 2011/0242369 A1* | 10/2011 | Misawa | H04N 13/239 | 348/240.2 |
| 2012/0268641 A1* | 10/2012 | Kazama | H04N 5/232945 | 348/333.11 |
| 2012/0307052 A1* | 12/2012 | Thiruvengada | H04N 5/232935 | 348/143 |
| 2014/0253544 A1* | 9/2014 | Arakita | G06T 7/0012 | 345/419 |
| 2014/0300688 A1* | 10/2014 | Shin | H04N 5/23238 | 348/36 |
| 2014/0333718 A1* | 11/2014 | Chang | H04N 5/23293 | 348/36 |
| 2018/0270426 A1 | 9/2018 | Ogawa | | |

* cited by examiner

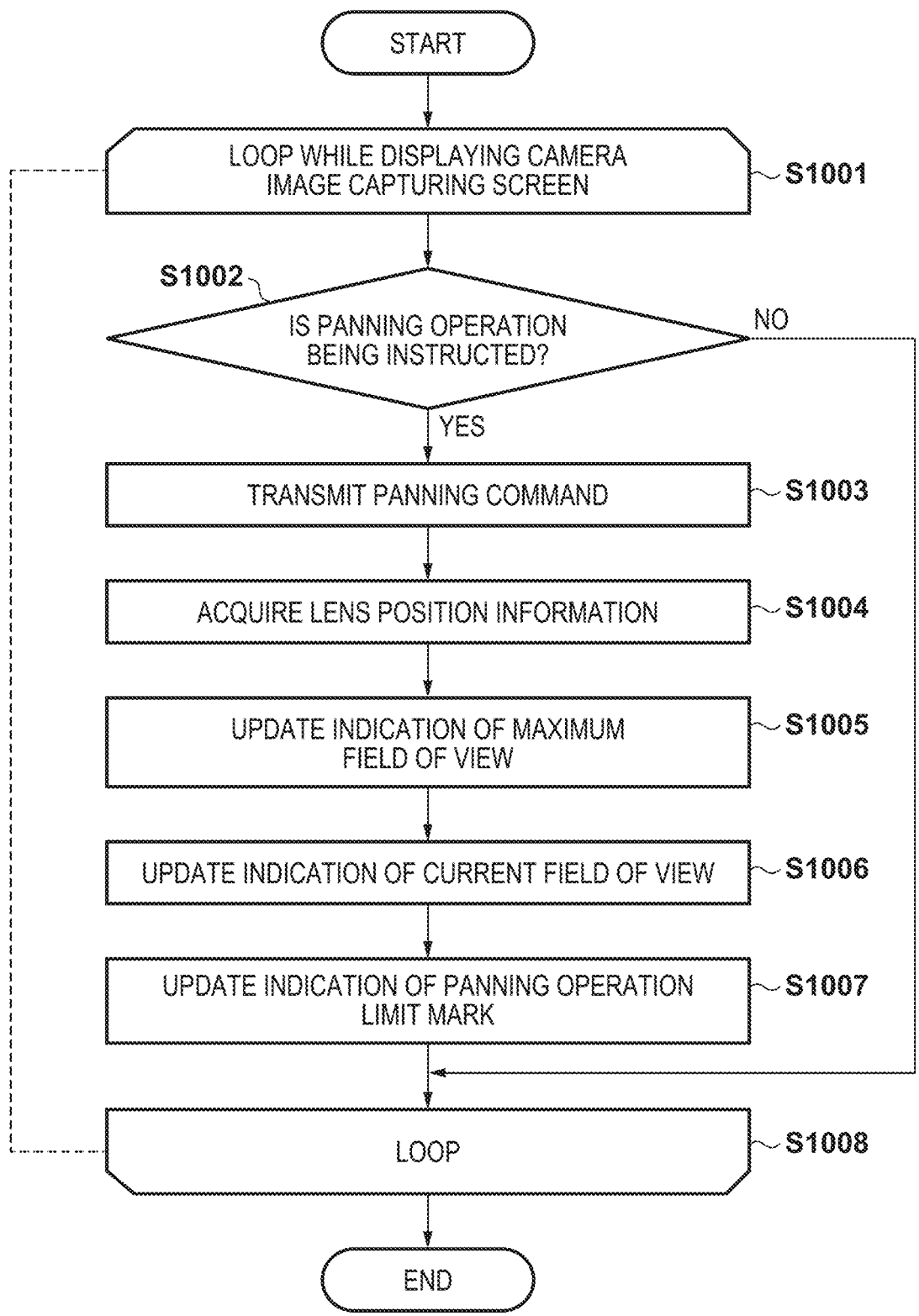

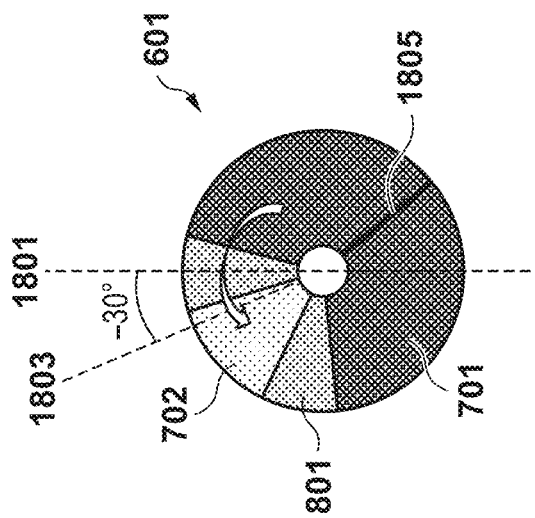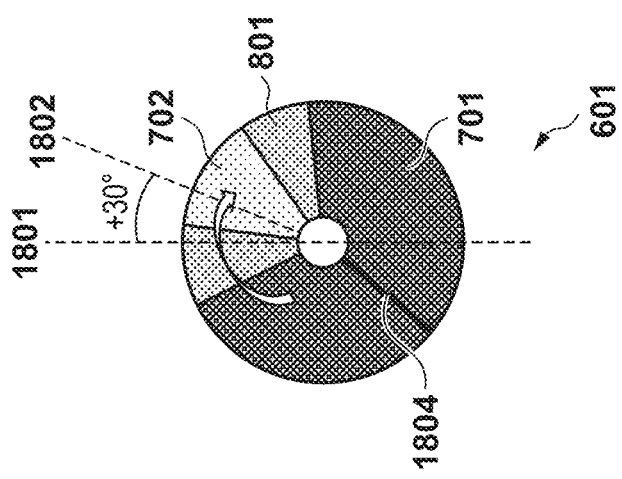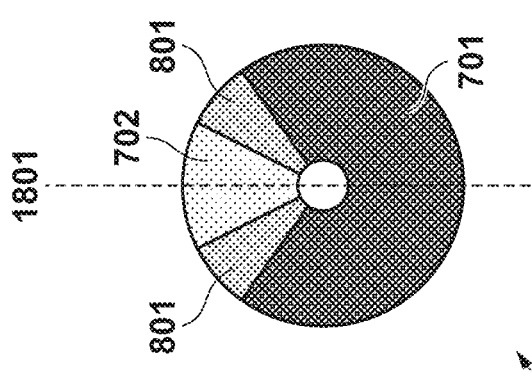

ELECTRONIC DEVICE CAPABLE OF REMOTELY CONTROLLING IMAGE CAPTURE APPARATUS AND CONTROL METHOD FOR SAME

BACKGROUND OF THE INVENTION

Field of the Invention

The present invention relates to an electronic device and a control method for the electronic device, and in particular, relates to an electronic device that can remotely control an image capture apparatus and a control method for the electronic device.

Description of the Related Art

There are image capture apparatuses that can be remotely controlled from an external apparatus that can communicate therewith via a network. Such image capture apparatuses, for example, are installed in a house in advance and are used for purposes such as monitoring a room of the house from a remote location via a smartphone, etc.

Some of such image capture apparatuses can remotely be changed their field of view by adjusting its orientation (panning and tilting angles) and an angle of view (zoom magnification) from an external apparatus. A user of an external apparatus can provide the image capture apparatus with an instruction to change the orientation and the angle of view by operating a user interface while viewing a captured image transmitted to the external apparatus from the image capture apparatus (Japanese Patent No. 3839881).

In Japanese Patent No. 3839881, on a camera control apparatus that remotely controls a camera, adjustable ranges of the pan, tilt, and zoom of the camera, and the current pan, tilt, and zoom magnification of the camera are displayed by scroll bars and the positions of sliders corresponding thereto.

However, due to such information being separately displayed, the relationship therebetween is hard to perceive. In addition, since the size of the field of view cannot be perceived from the zoom magnification scroll bar, it is hard to adjust the zoom magnification to be appropriate to capture a specific area. Furthermore, it is hard to perceive the limits of the adjustable ranges and whether or not the limits have been reached.

SUMMARY OF THE INVENTION

The present invention provides an electronic device and a control method for the electronic device that provide an improved user interface for remotely controlling an image capture apparatus by at least reducing at least one of such problems with a conventional technique.

According to an aspect of the present invention, there is provided an electronic device that displays an operation screen for remotely adjusting a field of view (FOV) of an image capture apparatus with which the electronic device can communicate, wherein the operation screen comprises a field-of-view user interface (FOV-UI) that includes an indication of a current field of view of the image capture apparatus and an indication of a maximum field of view at a current orientation of the image capture apparatus, and the electronic device comprises one or more processors that execute a program stored in a memory and, when executing the program, function as: a control unit configured to update the FOV-UI based on information acquired from the image capture apparatus.

According to another aspect of the present invention, there is provided a control method for an electronic device that displays an operation screen for remotely adjusting a field of view (FOV) of an image capture apparatus with which the electronic device can communicate, wherein the operation screen comprises a field-of-view user interface (FOV-UI) that includes an indication of a current field of view of the image capture apparatus and an indication of a maximum field of view at a current orientation of the image capture apparatus, and the control method comprises updating display of the FOV-UI based on information acquired from the image capture apparatus.

According to a further aspect of the present invention, there is provided a non-transitory computer-readable medium storing a program that causes, when executable by a processor, the processor to function as: a control unit configured to: display an operation screen for remotely adjusting a field of view (FOV) of an image capture apparatus with which the electronic device can communicate, on a display device, wherein the operation screen comprises a field-of-view user interface (FOV-UI) that includes an indication of a current field of view of the image capture apparatus and an indication of a maximum field of view at a current orientation of the image capture apparatus; and update the FOV-UI based on information acquired from the image capture apparatus.

Further features of the present invention will become apparent from the following description of exemplary embodiments (with reference to the attached drawings).

BRIEF DESCRIPTION OF THE DRAWINGS

FIG. 5 is a flowchart relating to processing for updating the field-of-view UI, pertaining to the first embodiment.

FIGS. 12A to 12C are diagrams relating to examples of the field-of-view UI and a display operation, pertaining to a third embodiment.

DESCRIPTION OF THE EMBODIMENTS

Figure 1A:
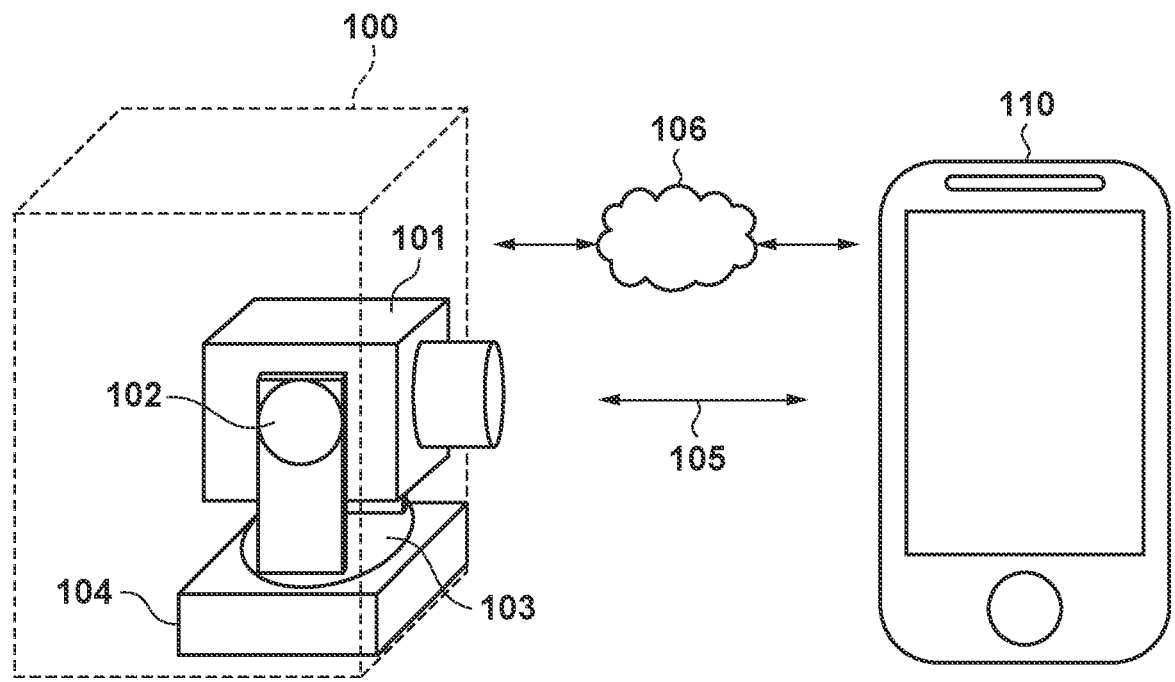
FIGS. 1A and 1B are schematic diagrams of a remote capturing system pertaining to embodiments.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Note that a case in which the present invention is implemented using a smartphone will be described in the following embodiments. However, the present invention is applicable to any electronic device that can communicate with an image capture apparatus. Such electronic devices include computer devices (personal computers, tablet computers, media players, PDAs, etc.), portable telephones, game devices, etc. These are examples, and the present invention is also applicable to other electronic devices.

First Embodiment

FIG. 1A schematically illustrates a configuration of a remote capturing system pertaining to the first embodiment. The remote capturing system includes an image capture apparatus 100 and a smartphone 110, which is an external device that remotely controls the image capture apparatus 100, and the image capture apparatus 100 and the smartphone 110 are connected so as to be capable of communicating with one another.

The image capture apparatus 100 includes a lens barrel 101, a tilt unit 102, a pan unit 103, and a control box 104.

The lens barrel 101 includes an image sensor and an image capture lens group serving as an image capture optical system. The lens barrel 101 performs image capture based on control by the control box 104, and outputs image data that is obtained to the control box 104. The image capture lens group includes movable lenses such as a focus lens and a variable magnification lens, and driving circuits therefor. The movable lenses are driven by the control box 104.

The lens barrel 101 is attached to the tilt unit 102 so that the lens barrel 101 can rotate. In accordance with an instruction from the control box 104, the tilt unit 102 drives the lens barrel 101 to rotate about a horizontal axis that is perpendicular to the optical axis of the image capture optical system. The elevation or depression angle of the lens barrel 101 (optical axis) is changed by the tilt unit 102.

The tilt unit 102 is attached to the pan unit 103. In accordance with an instruction from the control box 104, the pan unit 103 drives the tilt unit 102 to rotate about a vertical axis that is perpendicular to the optical axis of the image capture optical system. The azimuth angle of the lens barrel 101 (optical axis) attached to the tilt unit 102 changes by the pan unit 103 making the tilt unit 102 rotate.

Figure 1B:
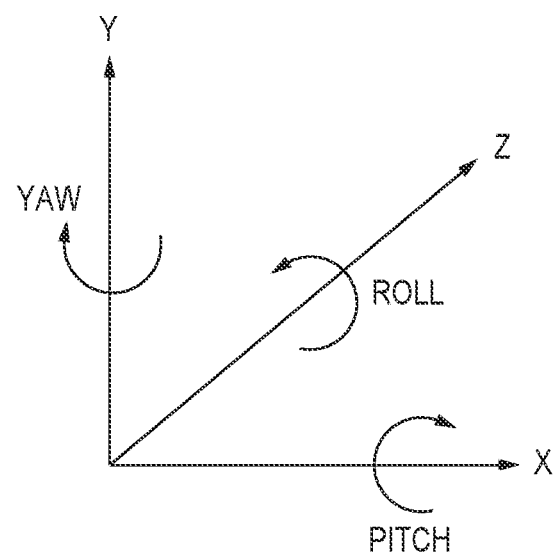

FIG. 1B illustrates an orthogonal coordinate system in which the optical axis of the image capture optical system is illustrated as the Z axis, and the point at which the image sensor and the optical axis intersect is illustrated as the origin. The tilt unit 102 has a rotation axis about the X axis (pitch direction), and the pan unit 103 has a rotation axis about the Y axis (yaw direction).

In accordance with an instruction from an operation member included in the image capture apparatus 100 or the smartphone 110, the control box 104 controls the drive of the movable lenses included in the lens barrel 101, the image capture operation by the lens barrel 101, and the operations of the tilt unit 102 and the pan unit 103. The control box 104 transmits data of a captured image and information regarding the image capture apparatus 100 to the smartphone 110.

The smartphone 110 is one example of an electronic device that can execute a remote control application for the image capture apparatus 100, for example. The smartphone 110 and the image capture apparatus 100 can communicate with one another by means of direct wireless or wired communication 105, or communication 106 via a computer network, a telephone network, etc. Note that the image capture apparatus 100 and the smartphone 110 can communicate using any communication protocol supported by both the image capture apparatus 100 and the smartphone 110.

Figure 2:
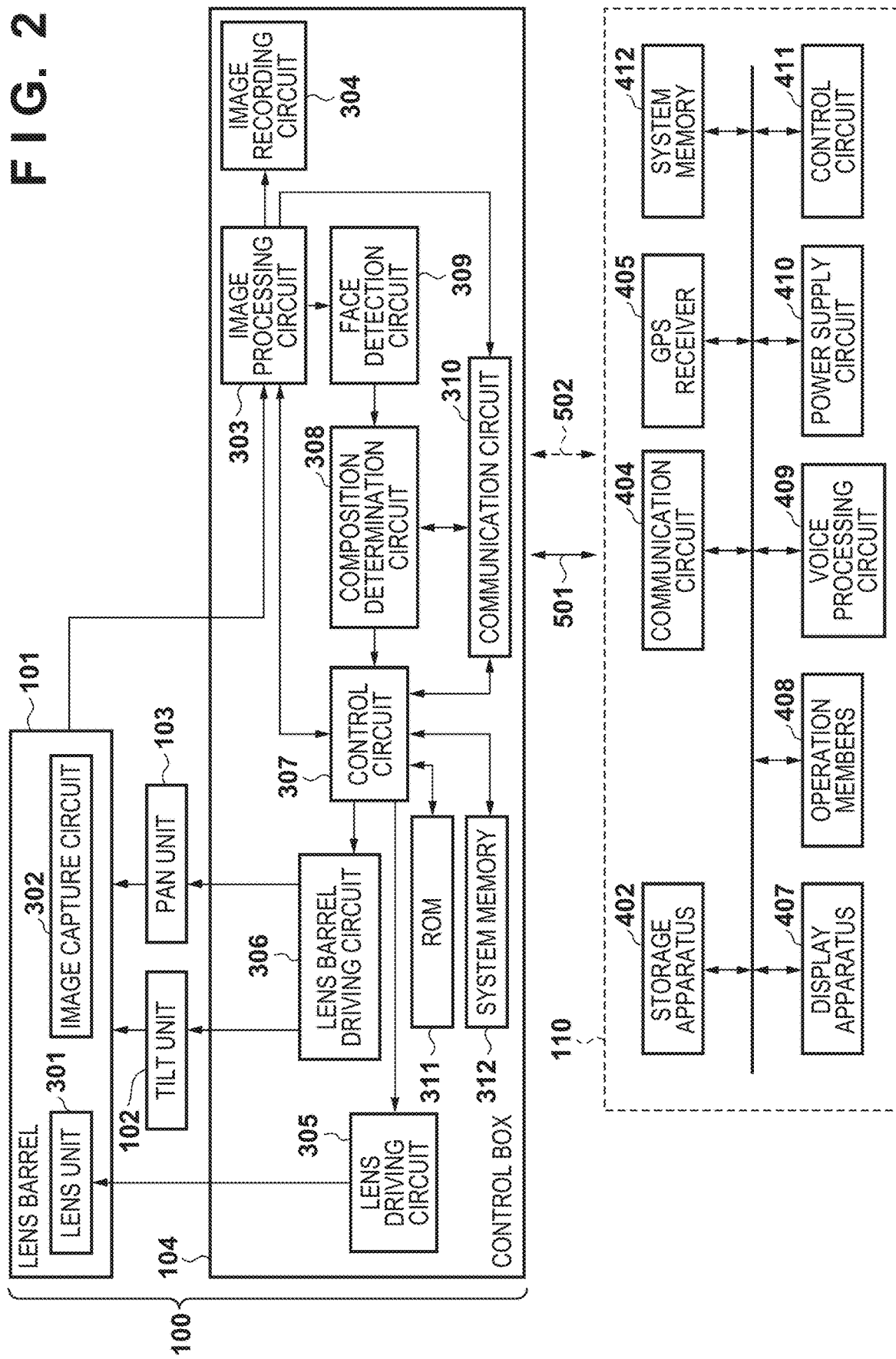
FIG. 2 is a block diagram illustrating an example of a functional configuration of the remote capturing system pertaining to the embodiments.

FIG. 2 is a block diagram illustrating an example of a functional configuration of the remote capturing system, and the same reference numerals are appended to configurations that are the same as those in FIGS. 1A and 1B.

The lens barrel 101 includes a lens unit 301 (image capture optical system) and an image capture circuit 302, and the optical axis direction can be adjusted by means of the tilt unit 102 and the pan unit 103.

The movable lenses included in the lens unit 301, such as the variable magnification lens and the focus lens, are driven by a lens driving circuit 305 of the control box 104. The lens unit 301 forms an optical image on an image capture surface of the image sensor, which is included in the image capture circuit 302.

The image capture circuit 302 includes the image sensor, which is a CMOS image sensor, for example, and converts the optical image formed by the lens unit 301 into an analog signal group (analog image signal) by means of a plurality of photoelectric conversion elements. Furthermore, the image capture circuit 302 applies AD conversion, noise reduction processing, etc., to the analog image signal, and outputs the result to the control box 104 as image data.

The tilt unit 102 includes a driving mechanism for making the lens barrel 101 rotate in the pitch direction in FIG. 1B. Also, the pan unit 103 includes a driving mechanism for making the tilt unit 102 rotate in the yaw direction in FIG. 1B. The lens barrel 101 is driven to rotate based on driving instructions input from a lens barrel driving circuit 306.

The control box 104 includes an image processing circuit 303, the lens driving circuit 305, the lens barrel driving circuit 306, a control circuit 307, a composition determination circuit 308, a face detection circuit 309, a communication circuit 310, a ROM 311, and a system memory 312.

The image processing circuit 303 applies image processing such as distortion correction, white balance adjustment, color interpolation processing, and encoding processing to the image data output by the image capture circuit 302 of the lens barrel 101, and generates image data for recording and image data for display. The image data for display may be obtained by reducing the resolution of the image data for recording. Also, the image processing circuit 303 may generate only the image data for recording.

The image data for recording is output to an image recording circuit 304. The image recording circuit 304 stores digital image data output from the image processing circuit 303 in a data file having a format corresponding to a specification such as JPEG or MPEG, and records the data file to a recording medium such as a non-volatile memory. Image data generated by the image processing circuit 303 is also output to the face detection circuit 309 and the communication circuit 310.

The face detection circuit 309 applies publicly-known face detection processing to the image data input from the image processing circuit 303, and detects one or more areas (face areas) that appear to be people's faces. The face detection circuit 309 outputs the detection result (the number of the face areas and position information of the face areas) to the composition determination circuit 308. Note that face areas are one example of a photographic subject area to which the image capture apparatus 100 applies a tracking function and an automatic composition determination function. Accordingly, the face detection circuit 309 is one example of a configuration for detecting a predetermined area of a photographic subject.

The communication circuit 310 is a communication interface for realizing communication between the smartphone 110 or another external device, and the image capture apparatus 100. The communication circuit 310 has a configuration supporting one or more of wired communication and wireless communication. Communication standards supported by the communication circuit 310 include USB, Ethernet (registered trademark), HDMI (registered trademark), wireless LAN (IEEE802.11 series), Bluetooth (registered trademark), 3GPP 3G, 4G, 5G, etc., for example, but are not limited to these.

The lens driving circuit 305 drives the zoom lens and the focus lens included in the lens unit 301 based on instructions (for example, target positions and driving speeds) input from the control circuit 307.

The lens barrel driving circuit 306 drives the tilt unit 102 and the pan unit 103 based on instructions (for example, rotation directions and rotation amounts) input from the control circuit 307.

The control circuit 307 is a microprocessor such as a CPU, for example, and controls the operations of the components of the image capture apparatus 100 and realizes the functions of the image capture apparatus 100 by loading programs stored in the ROM 311 to the system memory 312 and executing the programs.

The ROM 311 is a rewritable non-volatile memory, and stores programs executed by the control circuit 307 and various setting values of the image capture apparatus 100. The system memory 312 is a memory that the control circuit 307 uses when executing programs.

The control circuit 307 generates instructions or commands (for example, target positions and driving speeds) for controlling the lens driving circuit 305 and the lens barrel driving circuit 306 based on magnification information and position information input from the composition determination circuit 308. Furthermore, the control circuit 307 outputs the generated instructions to the lens driving circuit 305 and the lens barrel driving circuit 306.

The composition determination circuit 308 determines a composition based on the position information of the face areas detected in the captured image. The position information is input from the face detection circuit 309. The composition determination circuit 308 can determine the magnification so that the face areas are greater than or equal to a predetermined size, for example. Also, the composition determination circuit 308 can determine an image capture direction, i.e., an orientation of the image capture apparatus 100, lens barrel 101, or the lens unit 301, so that a face area is positioned at the center of the image, for example.

Furthermore, the composition determination circuit 308 calculates the magnification and target positions (panning and tilting angles) for realizing the magnification and image capture direction that have been determined, and outputs the results to the control circuit 307. Note that the composition determination method described here is a mere example, and other methods may be used.

In addition, if a command that is an instruction for a panning, tilting, or zooming operation is received from the smartphone 110 via the communication circuit 310, the composition determination circuit 308 determines a target position or magnification that is based on the command and outputs the result to the control circuit 307 and the communication circuit 310. Note that the operations of the composition determination circuit 308 may be executed by the control circuit 307.

Next, a configuration of the smartphone 110 will be described. A communication circuit 404 is a communication interface for realizing communication between the image capture apparatus 100 or another device, and the smartphone 110. The communication circuit 404 may basically have a configuration similar to that of the communication circuit 310 included in the image capture apparatus 100. However, since the smartphone 110 has a call function, the communication circuit 404 includes a function for communicating with a telephone communication network.

A control circuit 411 is a microprocessor such as a CPU, for example, and controls the operations of the components of the smartphone 110 and realizes the functions of the smartphone 110 by loading programs stored in a storage apparatus 402 to a system memory 412 and executing the programs.

The storage apparatus 402 is a rewritable non-volatile memory, and stores the programs executed by the control circuit 411, various setting values of the smartphone 110, GUI data, etc. A remote capturing application, which will be described later, is also stored in the storage apparatus 402. The system memory 412 is a memory that the control circuit 411 uses when executing programs. A part of the system memory 412 is also used as a video memory of a display apparatus 407.

A power supply circuit 410 supplies power to the constituent elements in the smartphone 110. The display apparatus 407 is a touch display, for example. The display apparatus 407 may have other functions, such as fingerprint sensor and speaker functions. User interfaces (UIs) provided by applications and the OS of the smartphone 110, captured images, etc., are displayed on the display apparatus 407.

Operation members 408 collectively refer to input devices used by a user to provide instructions to the smartphone 110, for example. The operation members 408 include a volume adjustment button, a power button, etc. Note that the touch panel provided in the display apparatus 407 is also included among the operation members 408.

A voice processing circuit 409 processes voice signals acquired from a microphone built into the smartphone 110, for example. The voice processing circuit 409 may have a voice recognition function. In this case, the user can use the user's voice to input commands and text. Note that the voice recognition function may be realized using a function of an external apparatus that can be communicated via the communication circuit 404.

A Global Positioning System (GPS) receiver 405 acquires position information (longitude and latitude information) of the smartphone 110 by performing positioning processing based on signals received from GPS satellites. Note that the position information of the smartphone 110 may be acquired using other methods, such as the Wi-Fi positioning system (WPS).

The control circuit 411 can use, as event information for controlling the image capture apparatus 100, information as to whether the current position information of the smartphone 110 is included in a preset geographical range or information as to whether a predetermined change in current position has been detected. For example, the control circuit 411 can use the event information as a trigger for starting and stopping image capture by the image capture apparatus 100.

The image capture apparatus 100 and the smartphone 110 perform bidirectional communication via the communication circuits 310 and 404. For example, the image capture apparatus 100 transmits audio and image signals obtained by the image capture circuit 302, information regarding the image capture apparatus 100, etc., to the smartphone 110, and receives various commands from the smartphone 110. For example, the smartphone 110 transmits commands for panning, tilting, zooming, and starting and stopping image capture to the image capture apparatus 100, and receives the execution results of the commands.

The communication circuits 310 and 404 can communicate by simultaneously or selectively using a plurality of communication channels based on different communication standards. For example, the communication circuits 310 and 404 can communicate using a first communication channel 501 that is based on a first standard (for example, a wireless LAN standard) and a second communication channel 502 that is based on a second standard (for example, the BLE standard). For example, power consumption can be reduced and efficient communication can be realized by performing communication based on a plurality of standards having suitable power consumption, communicable distance, and communication speed in accordance with the purpose of communication.

For example, once the image capture apparatus 100 is activated, the control circuit 307 of the image capture apparatus 100 monitors whether a communication request is received via the communication circuit 310. In this state, a moving picture may be captured or still images may be periodically captured, and the obtained image data may be recorded to the image recording circuit 304.

If the remote capturing application is executed on the smartphone 110, the control circuit 411 transmits a communication request to the image capture apparatus 100. Note that information necessary for the communication with the image capture apparatus 100 is set beforehand in the storage apparatus 402.

If the control circuit 307 receives a communication request from the smartphone 110, the control circuit 307 exchanges information with the control circuit 411 according to the procedure prescribed in the communication standard, and establishes communication. If the communication with the smartphone 110 is established, the control circuit 307 transmits information regarding the image capture apparatus to the smartphone 110. The information regarding the image capture apparatus may include information regarding the model of the apparatus and the size of the image sensor, and information regarding the image capture optical system. Also, the information regarding the image capture optical system may include a focal distance corresponding to the 1× zoom magnification, lens information (zoom magnification of image capture optical system, tilt unit rotation angle, and pan unit rotation angle), and adjustable ranges of the image capture optical system (for example, minimum and maximum values of magnification and rotation angles).

In addition, the control circuit 307 starts to transmit a captured image to the smartphone 110. The captured image transmitted to the smartphone 110 may be image data for display generated by the image processing circuit 303. If the image processing circuit 303 does not generate image data for display, the control circuit 307 may generate image data for display from image data for recording. Note that, while the image capture apparatus 100 captures a moving image having a predetermined frame rate here, the image capture apparatus 100 may capture still images in response to instructions from the smartphone 110.

If the control circuit 411 receives the information regarding the image capture apparatus from the image capture apparatus 100, communication with which has been established, the control circuit 411 stores the information to the system memory 412. In addition, if a captured image starts to be received from the image capture apparatus 100, the control circuit 411 displays, on the display apparatus 407, a GUI screen generated by the remote capturing application.

Figure 3:
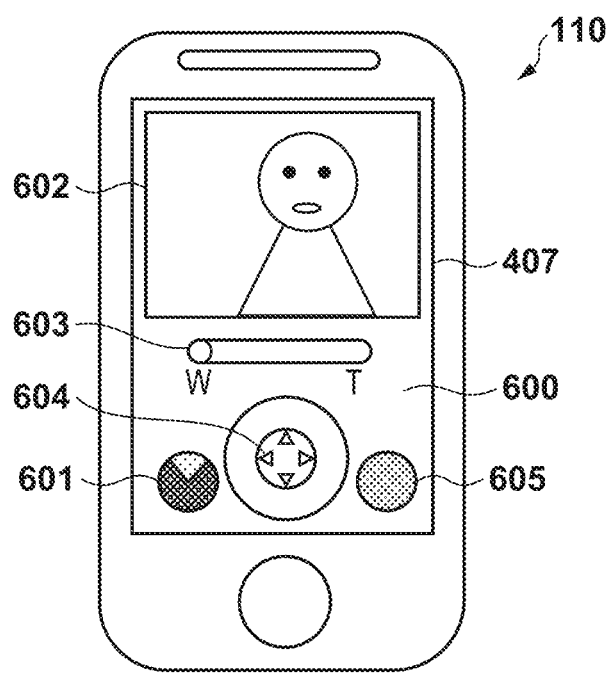
FIG. 3 is a diagram illustrating an example of a remote control screen, pertaining to a first embodiment.

FIG. 3 is a diagram illustrating an example of a camera operation screen 600, which is a GUI screen of the remote capturing application operating on the smartphone 110.

The camera operation screen 600 is displayed on the display apparatus 407 of the smartphone 110. A field-of-view UI (hereinafter, also referred to as FOV-UI) 601 is a display indicating the orientation of the camera (image capture direction) and the field of view (angle of view).

The image received from the image capture apparatus 100 is displayed in an image area 602. In addition, a zoom UI 603, a pan/tilt UI 604, and an image capture button UI 605 are arranged as remote control UIs for the image capture apparatus 100.

The control circuit 411 of the smartphone 110 monitors whether or not an operation is performed on the touch panel of the display apparatus 407, and if a touch operation on a remote control UI is detected, the control circuit 411 transmits a command corresponding to the operation to the image capture apparatus 100 via the communication circuit 404. For example, if an operation on the zoom UI 603 is detected, the control circuit 411 transmits a command indicating a zoom magnification corresponding to the slider position. Also, if an operation on the pan/tilt UI 604 (direction instructing UI) is detected, the control circuit 411 transmits a command that is an instruction for a panning operation and/or a tilting operation corresponding to the operated position of the pan/tilt UI 604. For example, while the operation on the pan/tilt UI 604 continues, the control circuit 411 can periodically transmit commands indicating panning and tilting rotation angles increments that have directions and magnitudes corresponding to the horizontal and vertical components of the coordinates of the operated position on the pan/tilt UI 604. Also, if an operation on the image capture button UI 605 is detected, the control circuit 411 transmits a command that starts or stops image capture for recording performed by the image capture apparatus 100. Note that these are examples, and operations on UIs and the contents of transmitted commands can be determined as appropriate.

If a command is received from the smartphone 110 via the communication circuit 310, the control circuit 307 of the image capture apparatus 100 controls the operations of the components so as to realize an operation corresponding to the received command. In addition, the control circuit 307 transmits the current lens information (current values of the zoom magnification of the image capture optical system, the tilt unit rotation angle, and the pan unit rotation angle) to the smartphone 110. In such a manner, the user can remotely provide instructions for zooming, panning, tilting, and starting and stopping image capture by performing touch operations on the remote control UIs.

FIGS. 4A to 4D illustrate display examples of the field-of-view UI 601. The field-of-view UI 601 is a UI that can collectively display the current image capture direction (panning direction), field of view (FOV), and maximum field of view of the image capture apparatus 100 in the horizontal plane.

Figure 4A:
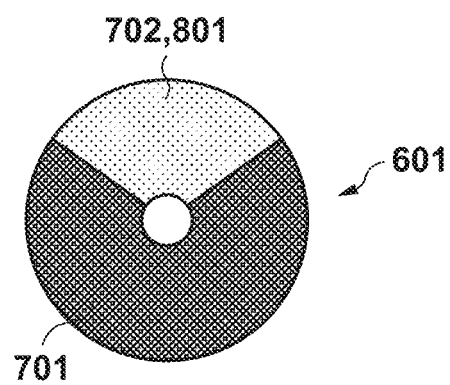
FIGS. 4A to 4D are diagrams illustrating examples of a field-of-view UI, pertaining to the first embodiment.

In the example illustrated in FIG. 4A, the field-of-view UI 601 has indications of the maximum field of view 801, a current field of view 702, and an impossible range of field of view 701 so as to be visually distinguishable from one another. The indication of the maximum field of view 801 indicates the maximum field of view that can be captured without changing the image capture direction, and corresponds to the angle of view at 1× zoom magnification in the present embodiment. The field of view 702 indicates the range that is captured with the current zoom magnification. Since a state at 1× zoom magnification is indicated in the example illustrated in FIG. 4A, the maximum field of view 801 is equal to the field of view 702. In this case, the indication of the maximum field of view 801 is concealed by the indication of the field of view 702. The impossible range of field of view 701 indicates a range that cannot be captured with the current image capture direction. Depending on the movable range of the pan unit 103 and the focal distance of the lens unit, the impossible range of field of view 701 may include a range that cannot be captured even if the image capture direction is changed.

FIG. 4A illustrates the field-of-view UI 601 when settings of the image capture apparatus 100, such as the image capture direction and the zoom magnification, are in their initial states. Note that the panning rotation angle and the tilting rotation angle are both 0° and the zoom magnification is 1× in the initial state of the image capture apparatus 100. In this state, the field of view and the maximum field of view are equal. Accordingly, the indication of the maximum field of view 801 is concealed by the indication of the field of view 702. The radial direction that equally divides the field of view 702 (or maximum field of view 801) into two indicates the image capture direction. The method for realizing indication in a visually distinguishable state in the field-of-view UI 601 is not particularly limited, but one or more among color, thickness or brightness, fill pattern, and display method (whether or not flickering is performed, etc.) can be varied.

Figure 4B:
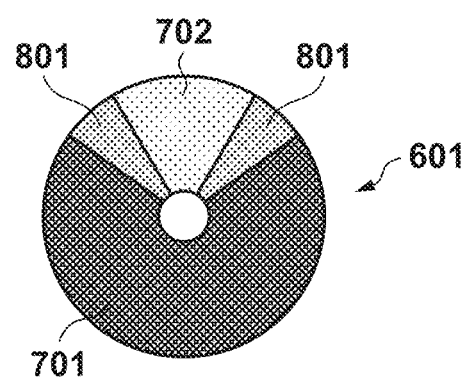

FIG. 4B illustrates an example of the field-of-view UI 601 in a case in which the zoom magnification has become greater than 1× (2× in this example) with the image capture direction unchanged from the state in FIG. 4A. The field of view (angle of view) becomes narrower if the zoom magnification becomes greater than 1×, and thus, the indication of the current field of view 702 has become smaller. Accordingly, part of the indication of the maximum field of view 801 at the current image capture position can be seen. In FIG. 4B, the indication of the maximum field of view 801 indicates a range that is not captured with the current zoom magnification but would be captured if the zoom magnification was reduced.

Figure 4C:
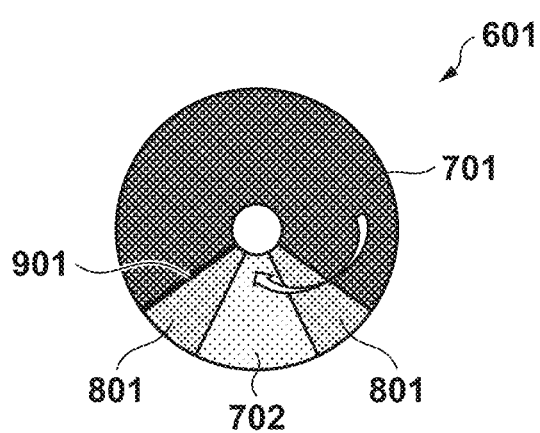
Figure 4D:
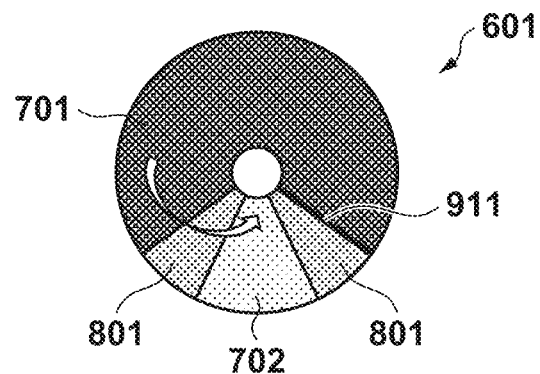

FIGS. 4C and 4D each illustrate an example of the field-of-view UI 601 in a case in which a panning operation is performed from the state in FIG. 4B. FIG. 4C illustrates an example in a case in which a panning operation to the right (clockwise panning operation) is performed, and FIG. 4D illustrates an example in a case in which a panning operation to the left (anticlockwise panning operation) is performed. Here, suppose that, in either case, the panning operation is performed until the operation limit angle of the pan unit 103 is reached. Note that the operation limit angle is the physical maximum rotation angle of the pan unit 103.

In FIGS. 4C and 4D, limit marks 901 and 911 are displayed indicating that rotation in the current rotation direction cannot be performed any further. The limit marks 901 and 911 also serve as an indicator regarding a maximum field of view in a case in which the image capture direction is changed to the maximum extent from the initial state by a panning operation. Here, in the field-of-view UI 601, the limit marks 901 and 911 are each displayed at a position, in accordance with the rotation direction, that corresponds to the maximum rotatable angle. Practically speaking, a straight line corresponding to a greater rotation angle among the two straight lines indicating the left and right edges of the maximum field of view 801 is displayed in an emphasized state and is thereby used as the limit marks 901 and 911. However, this is one example, and the limit marks 901 and 911 may be displayed as discrete marks. In addition, the state in which rotation has reached the limit angle may be displayed by making the entire field-of-view UI 601 flicker, or by changing a display method in the field-of-view UI 601.

FIG. 5 is a flowchart relating to an operation for displaying the field-of-view UI 601, performed by the remote capturing application operating on the smartphone 110.

As indicated by steps S1001 and S1008, this operation is executed repeatedly while a captured image that the smartphone 110 receives from the image capture apparatus 100 is being displayed in the image area 602.

In step S1002, the control circuit 411 determines whether or not the pan/tilt UI 604 is being operated, and advances processing to step S1003 if it is determined that the pan/tilt UI 604 is being operated and to step S1008 if it is not determined so. Note that, while description regarding tilting operations is omitted here since the focus is on the field-of-view UI 601 relating to panning operations, tilting operations can also be executed similarly to panning operations using a UI similar to the field-of-view UI 601.

In step S1003, the control circuit 411 generates a panning command corresponding to the operation on the pan/tilt UI 604, and transmits the panning command to the image capture apparatus 100 via the communication circuit 404.

The control circuit 307 of the image capture apparatus 100 drives the pan unit 103 based on the panning command received from the smartphone 110. Then, the control circuit 307 transmits, to the smartphone 110, the rotation angle of the pan unit 103 after the pan unit 103 is driven (for example, an angle of which the reference position is set to 0°, leftward rotation is negative, and the rightward rotation is positive) as modified pan position information. Note that the control circuit 411 may acquire the modified pan position information by requesting the information from the control circuit 307.

In step S1004, the control circuit 411 acquires the current lens information from the image capture apparatus 100 via the communication circuit 404, and stores the current lens information to the system memory 412. Then, the control circuit 411 updates the indication of the field-of-view UI 601 based on the lens information.

First, in step S1005, the control circuit 411 updates the indication of the maximum field of view. The control circuit 411 assumes that the maximum field of view and the field of view are equal (that the zoom magnification is 1×) at this point, and practically speaking, indications the maximum field of view as the field of view, as illustrated in FIG. 4A.

Next, in step S1006, the control circuit 411 updates the indication of the field of view in accordance with the zoom magnification.

Then, in step S1007, the control circuit 411 updates the indication of the panning operation limit mark, and terminates processing.

Figure 6:
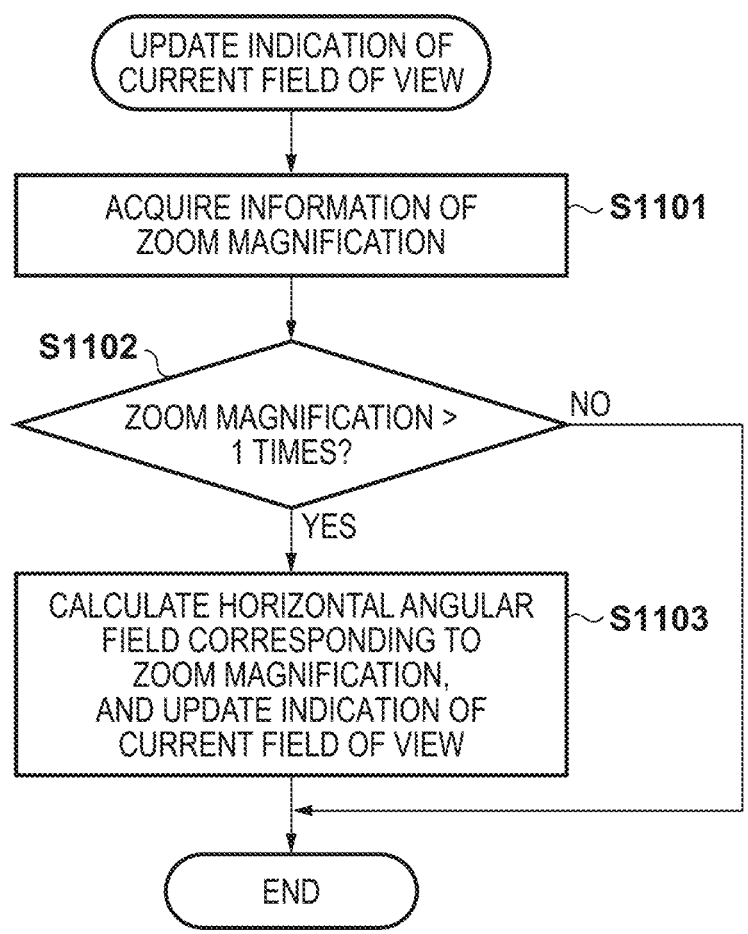
FIG. 6 is a flowchart relating to the processing for updating the field-of-view UI, pertaining to the first embodiment.

FIG. 6 is a flowchart of update processing of the indication of the field of view performed in step S1006 in FIG. 5.

In step S1101, the control circuit 411 refers to the current zoom magnification included in the lens information acquired in step S1004.

In step S1102, the control circuit 411 determines whether the current zoom magnification is greater than 1×, and advances processing to step S1103 if it is determined that the current zoom magnification is greater than 1× and terminates the update processing if it is not determined so. If the zoom magnification is 1×, the field of view is equal to the maximum field of view. Furthermore, there is no need to update the indication any further since it is assumed that the field of view is equal to the maximum field of view and the maximum field of view is displayed as the field of view in step S1005.

In step S1103, the control circuit 411 acquires a horizontal angle of view corresponding to the current zoom magnification, and updates the indication of the field of view 702. Note that the horizontal angle of view can be acquired by storing in advance to the storage apparatus 402 a table in which a plurality of zoom magnifications and corresponding horizontal angle of views are associated with one another, and referring to the table using the current zoom magnification.

Note that the control circuit 411 may calculate the horizontal angle of view corresponding to the current zoom magnification using the following expression, for example. Here, the unit of the angle that can be acquired by "$\tan^{-1}$" is the radian.

$$\text{Horizontal angle of view [deg]}=2\times\tan^{-1}(\text{horizontal-direction size of image sensor [mm]})/(2\times\text{focal distance of lens unit [mm]})\times 180[\text{deg}]/\pi$$

As the size of the image sensor, the control circuit 411 uses the value stored in the system memory 412. Furthermore, the focal distance is calculated from the zoom magnification. Since the focal distance is proportional to the zoom magnification, if the focal distance at 1× zoom magnification is 19 mm, the focal distance at 2× zoom magnification can be calculated as 19 [mm]×2=38 [mm], for example. Accordingly, in a case in which the horizontal size of the image sensor is 36 mm and the focal distance is 38 mm (2× zoom magnification), the horizontal angle of view is: $2\times\tan^{-1}(36 [\text{mm}]/(2\times 38 [\text{mm}]))\times 180 [\text{deg}]/\pi=50.7 [\text{deg}]$.

Figure 7:
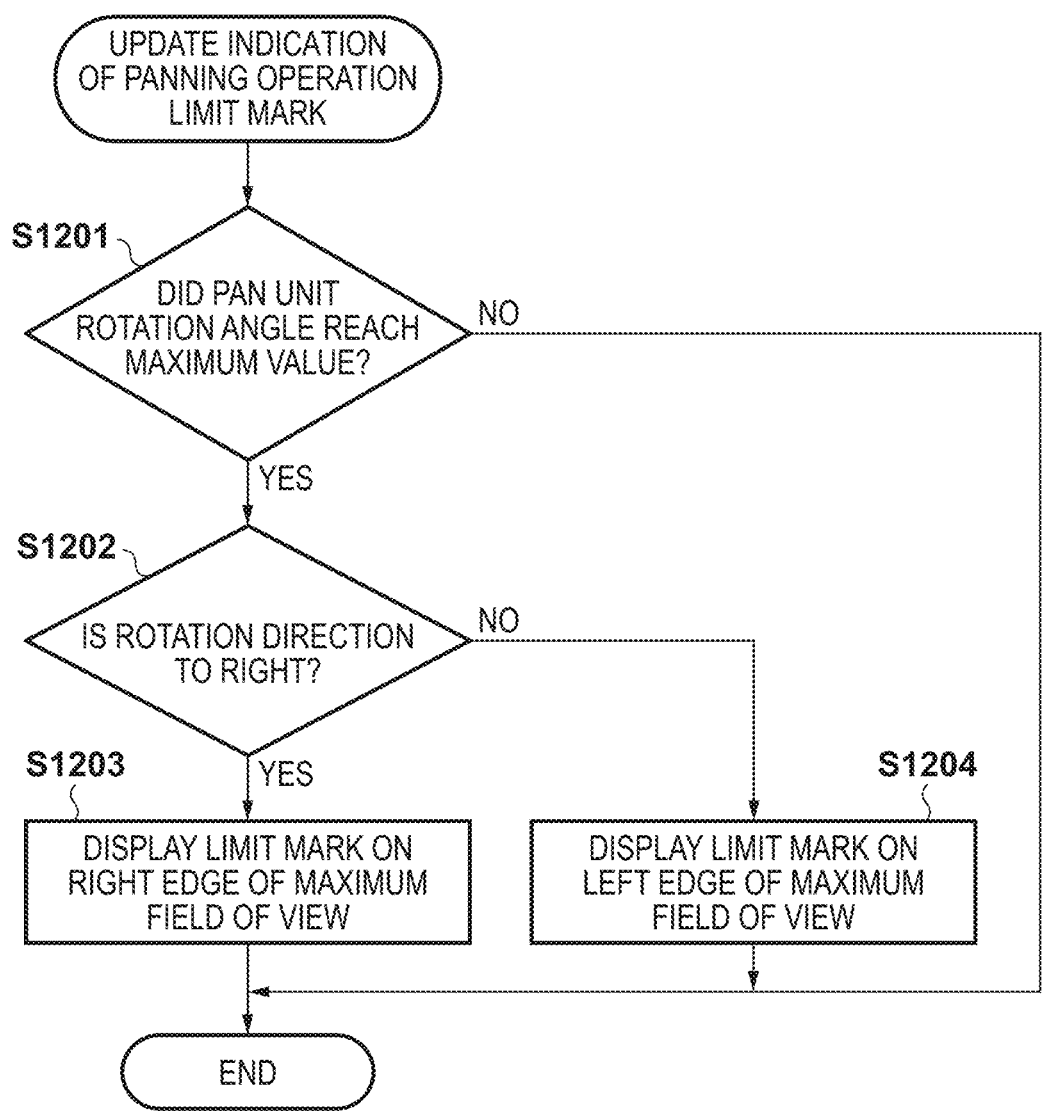
FIG. 7 is a flowchart relating to the processing for updating the field-of-view UI, pertaining to the first embodiment.

FIG. 7 is a flowchart of update processing of the panning operation limit mark performed in step S1007 in FIG. 5.

In step S1201, the control circuit 411 refers to the pan unit rotation angle included in the lens information acquired in step S1004. Furthermore, the control circuit 411 determines whether or not the pan unit rotation angle has reached the maximum value, and advances processing to step S1202 if it is determined that the maximum value has been reached and terminates processing if it is not determined so. In such a manner, in the present embodiment, a limit mark is displayed if the pan unit rotation angle has reached the maximum value.

In step S1202, the control circuit 411 determines whether or not the current panning direction is to the right (clockwise), and advances processing to step S1203 if it is determined that the current panning direction is to the right and to step S1204 if it is not determined so. For example, the control circuit 411 can determine that the panning direction is to the right if the current pan unit rotation angle has the plus sign.

In step S1203, the control circuit 411 displays the limit mark 901 in the field-of-view UI 601 by displaying the right edge of the maximum field of view 801 when facing the image capture direction in an emphasized state, as illustrated in FIG. 4C, and terminates processing.

Also, in step S1204, the control circuit 411 displays the limit mark 911 in the field-of-view UI 601 by displaying the left edge of the maximum field of view 801 when facing the image capture direction in an emphasized state, as illustrated in FIG. 4D, and terminates processing.

FIGS. 8A to 8D are diagrams each illustrating an example of the field-of-view UI 601 in a case in which, in a state in which the maximum rotation angle is already reached in a given rotation direction, an operation that is an instruction for a panning operation in the same direction is further performed in the present embodiment. The same reference numerals are appended to configurations that are the same as those in FIGS. 4A to 4D.

Figure 8A:
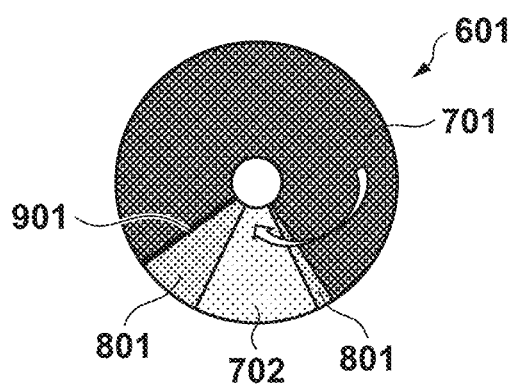
FIGS. 8A to 8D are diagrams illustrating examples of the field-of-view UI, pertaining to the first embodiment.

FIG. 8A illustrates an example of the field-of-view UI 601 when, in a state in which the pan unit rotation angle has reached the maximum rotation angle to the right and the limit mark 901 is displayed, an operation that is an instruction for a panning operation to the right is further detected. In this case, the control circuit 411 updates the indication so that the maximum field of view 801 becomes narrower. Here, the control circuit 411 updates the indication so that it appears that the left edge of the maximum field of view 801 when facing the image capture direction is moving to the right. If the user operation continues, the narrowed area 801 ultimately coincides with the boundary with the field of view 702 (becomes substantially invisible).

Figure 8B:
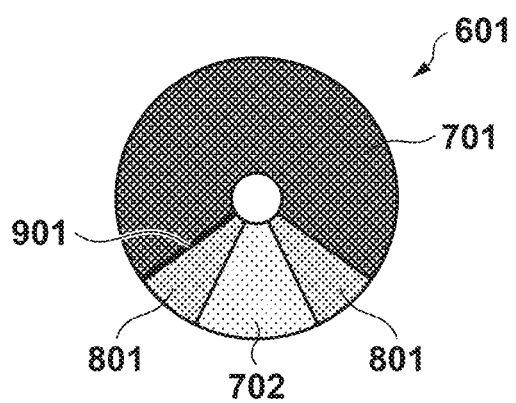

If the user operation ceases to be detected, the control circuit 411 returns the display of the field-of-view UI 601 to its normal state, as illustrated in FIG. 8B.

This can be similarly performed for a panning operation to the left.

Note that an example in which the indication of the maximum field of view is narrowed has been described as the display method when an operation for a panning operation exceeding the maximum rotation angle is detected. However, other methods may be used, such as narrowing the indication of the field of view or displaying the indication of the maximum field of view to reach an area slightly beyond the limit mark.

Figure 8C:
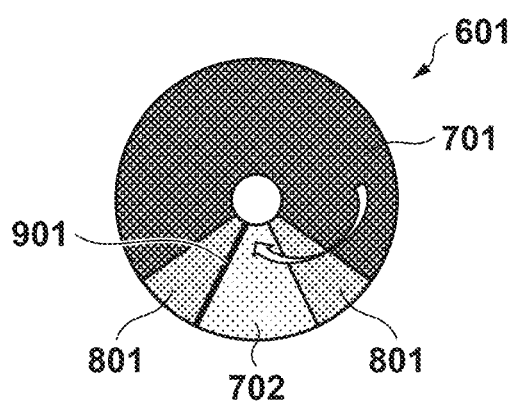
Figure 8D:
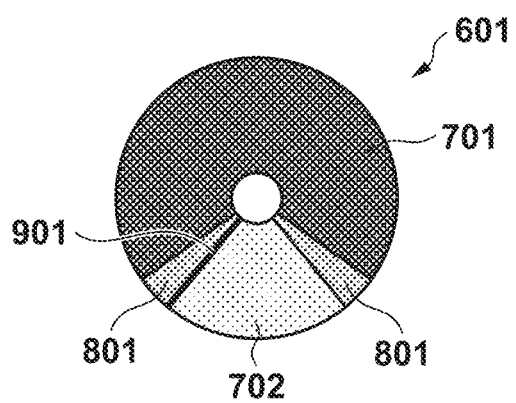

Also, as illustrated in FIGS. 8C and 8D, the limit mark may be displayed at an edge of the maximum field of view. In this case, the user would be able to find out the extent to which the field of view can be expanded by changing the zoom magnification although the substantial panning rotation angle does not change.

Similarly to FIG. 8A, FIG. 8C illustrates an example of the field-of-view UI 601 when, in a state in which the pan unit rotation angle has reached the maximum rotation angle to the right and the limit mark 901 is displayed, an operation that is an instruction for a panning operation to the right is further detected.

In FIG. 8C, the limit mark 901 is displayed at the position of an angle corresponding to the right edge of the field of view 702 when facing the image capture direction.

If an operation for reducing the zoom magnification is performed in this state, the indication of the field of view 702 is updated in accordance with the modified zoom magnification, as already described in connection with FIG. 6. The field of view broadens if the zoom magnification is reduced, and thus, the indication of the field of view 702 in the field-of-view UI 601 also expands and assumes a state as illustrated in FIG. 8D. Although a reduction in zoom magnification does not lead to a change in panning rotation angle, a reduction in zoom magnification is similar to an increase in panning rotation angle from the viewpoint that the field of view to the right expands. By the limit mark 901 being displayed at an edge of the field of view, the positions of the edges of which change depending upon the zoom magnification, rather than at an edge of the maximum field of view, it becomes easier to perceive that the field of view in the rotation direction expands by reducing the zoom magnification.

Note that, while the indication of the maximum field of view 801 has the advantage that the extent to which the field of view can be expanded by reducing the zoom magnification can be perceived, the indication of the maximum field of view 801 is not necessary.

Note that the above-described display control operations of the field-of-view UI relating to panning operations can be similarly performed also for tilting operations.

In addition, also for the zoom magnification control range, limit marks that clearly indicate to the user that the maximum and minimum zoom magnifications are reached may be introduced. While a case in which the minimum zoom magnification is reached can also be identified by the maximum field of view 801 being completely concealed by the field of view 702, it is difficult to identify a case in which the maximum zoom magnification is reached. Accordingly, the display method of the field of view 702, for example, in a case in which the maximum zoom magnification is reached can be visually varied from that when this is not the case, for example. The display method of the field of view 702, for example, can be visually varied also in a case in which the minimum zoom magnification is reached. In this case, a display method similar to that in the case in which the maximum zoom magnification is reached may be adopted, or a different display method may be adopted.

As described above, according to the present embodiment, the image capture direction, the current field of view, and the maximum field of view are indicated all together in one UI on an external device that remotely controls the image capture direction and the field of view of an image capture apparatus. Accordingly, the user of the external device can change the zoom magnification while checking the relationship between the current field of view and maximum field of view. In addition, if a limit of the adjustable range of the image capture direction is reached, the state is clearly and visually indicated on the UI. Thus, the user of the external device can easily find out that an adjustment limit of the image capture direction has been reached.

Second Embodiment

Figure 9:
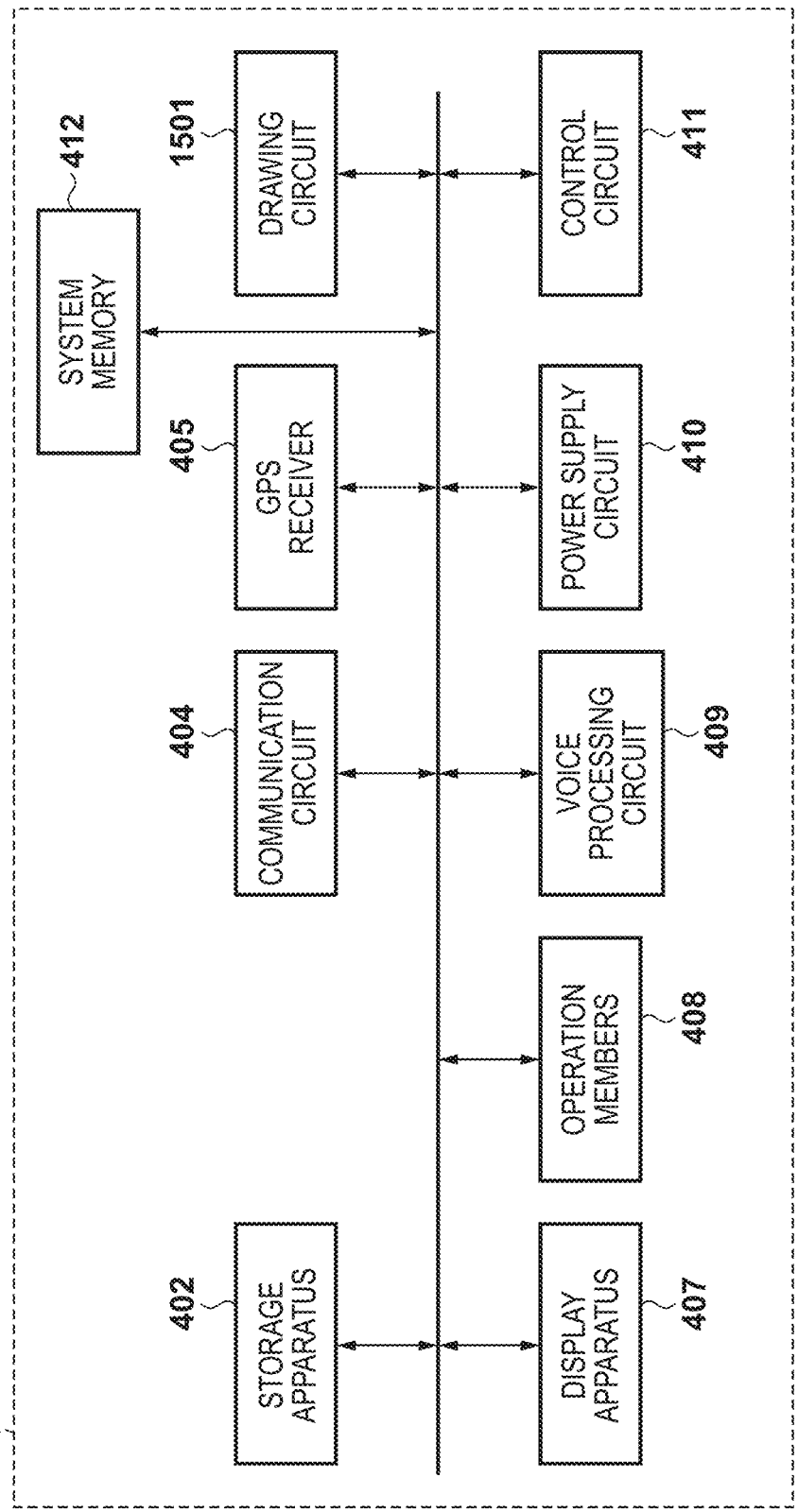
FIG. 9 is a block diagram illustrating an example of a functional configuration of a smartphone, pertaining to a second embodiment.

Next, a second embodiment of the present invention will be described. FIG. 9 is a block diagram illustrating an example of a functional configuration of a smartphone 1500, which is an external device pertaining to the second embodiment of the present invention. In FIG. 9, the same reference numerals as those in FIG. 2 are appended to functional blocks similar to those of the smartphone 110 described in the first embodiment, and overlapping description is omitted. The smartphone 1500 pertaining to the present embodiment includes a drawing circuit 1501. Also, the description of the image capture apparatus 100 is omitted because the configuration of the image capture apparatus 100 may be the same as that in the first embodiment.

The drawing circuit 1501 is a processing block that generates a synthesized image in which a different image is overlaid onto an image displayed on the display apparatus 407. The synthesized image is displayed on the display apparatus 407 by being written to the video memory area of the system memory 412. In the first embodiment, a part of the field-of-view UI 601 was displayed in an emphasized state and was thereby made to function as a limit mark. In the present embodiment, a different image is overlaid on the field-of-view UI 601 as a limit mark.

Figure 10:
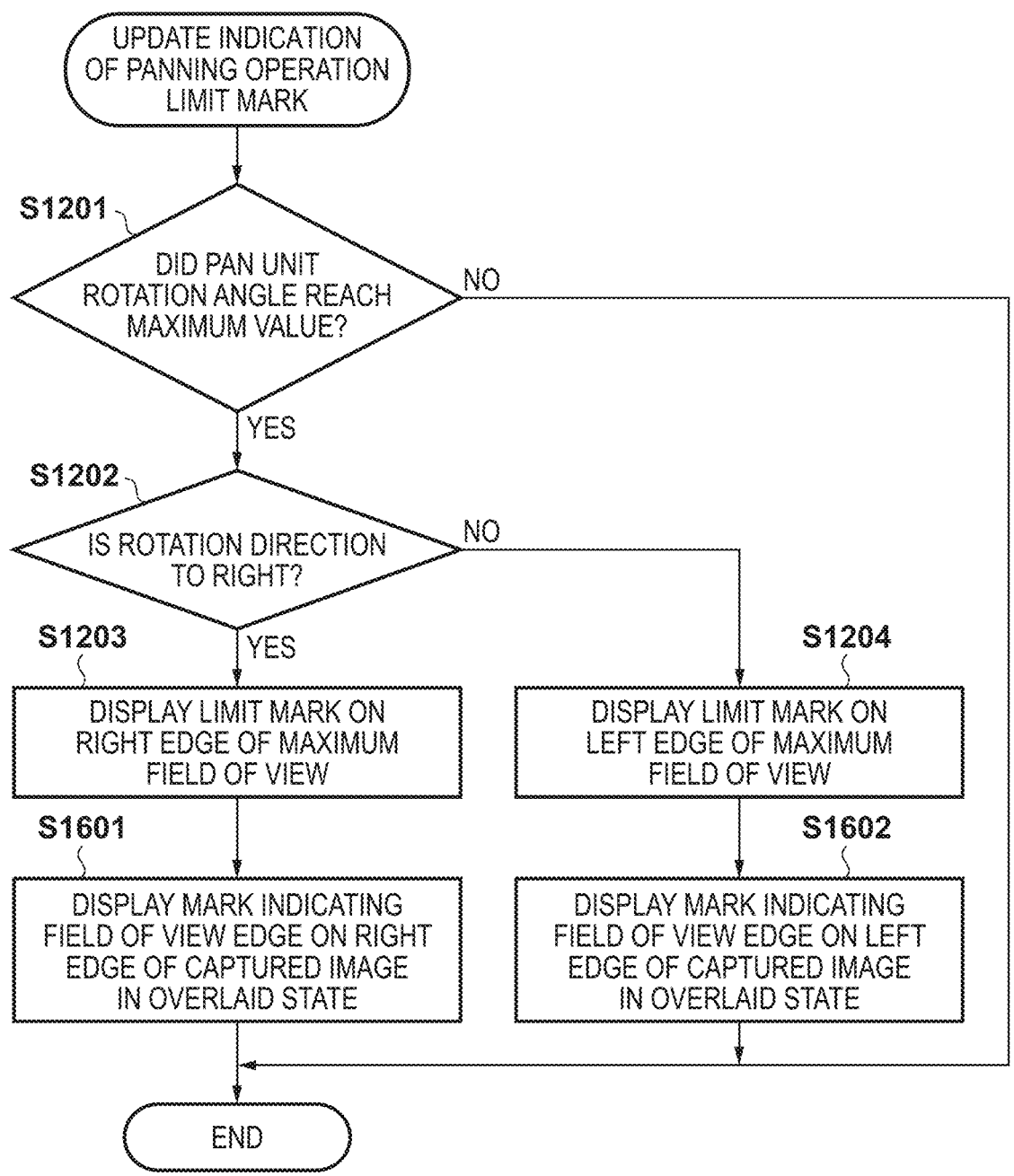
FIG. 10 is a flowchart relating to the processing for updating the field-of-view UI, pertaining to the second embodiment.

FIG. 10 is a flowchart of update processing of panning operation limit mark in the present embodiment. Reference numerals that are the same as those in FIG. 7 are appended to steps in which operations that are the same as those in the first embodiment are performed, and description thereof is omitted. The present embodiment includes a processing step S1601 performed after step S1203, and a processing step S1602 performed after step S1204.

Accordingly, symbols that are the same as those in the first embodiment are appended to processing other than steps S1601 and S1602, and description thereof is omitted.

In a case in which it is determined that the panning rotation direction is to the right, the control circuit 411, after displaying the right edge of the maximum field of view 801 in an emphasized state, instructs the drawing circuit 1501 to overlay an image serving as a limit mark on the right edge of the captured image displayed in the image area 602 in step S1601. Accordingly, a limit mark is displayed in an overlaid state on the right edge of the captured image displayed in the image area 602 of the field-of-view UI 601.

Also, in a case in which it is determined that the panning rotation direction is to the left, the control circuit 411, after displaying the left edge of the maximum field of view 801 in an emphasized state, instructs the drawing circuit 1501 to overlay an image serving as a limit mark on the left edge of the captured image displayed in the image area 602 in step S1602. Accordingly, a limit mark is displayed in an overlaid state on the left edge of the captured image displayed in the image area 602 of the field-of-view UI 601.

The overlaid display of limit marks on the captured image in the present embodiment will be further described with reference to FIGS. 11A and 11B.

Figure 11A:
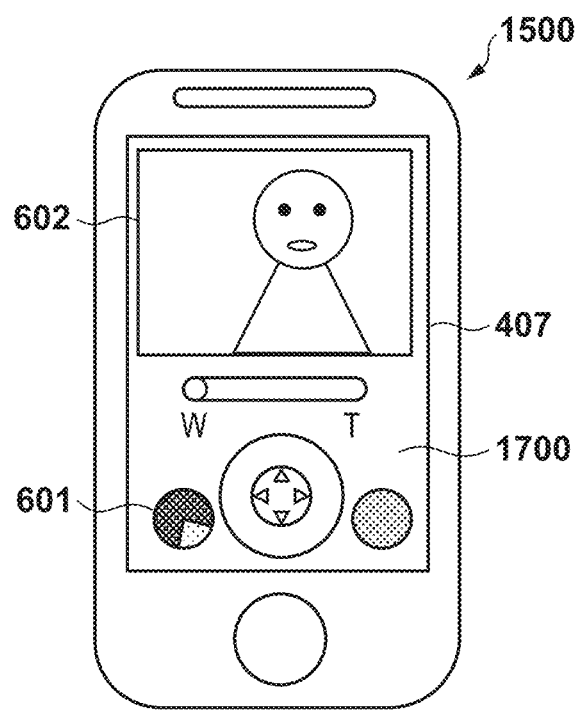
FIGS. 11A and 11B are diagrams illustrating examples of the remote control screen, pertaining to the second embodiment.
Figure 11B:
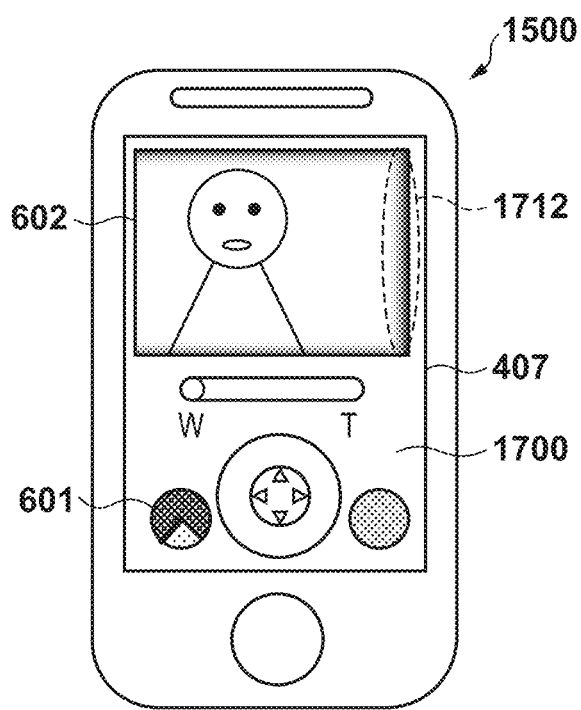

FIGS. 11A and 11B are diagrams illustrating examples of a remote control screen 1700 provided by a remote control application pertaining to the present embodiment. Reference numerals that are the same as those in FIG. 3 and FIGS. 4A to 4D are appended to configurations similar to those of the remote control screen 600 described in the first embodiment.

FIG. 11A illustrates the remote control screen 1700 in a state in which the rotation angle of the pan unit has not reached the maximum rotation angle, which is basically the same as the remote control screen 600 illustrated in FIG. 3. If an instruction for a panning operation to the right is provided from this state and the rotation angle of the pan unit reaches the maximum rotation angle, the remote control screen 1700 changes as illustrated in FIG. 11B.

In FIG. 11B, the right edge of the maximum field of view is displayed in an emphasized state in the field-of-view UI 601. In addition, an image 1712 serving as a limit mark is displayed in an overlaid state on the right edge of the captured image displayed in the image area 602. Here, a low-luminance image that has a predetermined width and extends across the entire right edge is used as the image 1712 serving as a limit mark. However, this is one example, and a different image may be used.

Also, for tilting operations, a configuration can be adopted such that a limit mark is displayed in an overlaid-state on the upper edge of the captured image if the upper-direction rotation angle of the tilt unit reaches the maximum rotation angle, and such that a limit mark is displayed in an overlaid-state on the lower edge of the captured image if the lower-direction rotation angle of the tilt unit reaches the maximum rotation angle.

Note that, while a case in which the zoom magnification is 1× is described in the present embodiment, processing can be similarly performed even if the zoom magnification is greater than 1×.

According to the present embodiment, a limit mark is displayed not only in the field-of-view UI but also on the captured image received from the image capture apparatus. Accordingly, in addition to the effects of the first embodiment, there is an advantage that the user could easily realize that a limit of an adjustable range has been reached. Note that a configuration may also be adopted such that no limit mark is displayed in the field-of-view UI, and a limit mark is displayed only on the captured image.

Third Embodiment

Next, a third embodiment of the present invention will be described. In the first and second embodiments, configurations were adopted in which a limit mark is displayed when a limit of an adjustable range of the field of view (for example, the maximum rotation angle of the pan unit 103 or the tilt unit 102) has been reached. In contrast, in the present embodiment, the display of a limit mark is started at the time point when the image capture direction changes beyond a predetermined amount from the initial state. The present embodiment is the same as the first embodiment, with the exception of the panning operation limit mark display update processing performed in step S1007 in FIG. 5. Accordingly, the present embodiment will be described in the following focusing on the differences from the first embodiment.

FIGS. 12A to 12C are diagrams for describing display control of the field-of-view UI 601 in the present embodiment. The same reference numerals as those in FIG. 3 and FIGS. 4A to 4D are appended to constituent elements that are the same as those in the first embodiment, and overlapping description is omitted.

In FIGS. 12A to 12C, a dotted line 1801 indicates the center position (image capture direction) of the field of view in the initial state of the image capture apparatus 100. In the initial position, the rotation angles of the tilt unit 102 and the pan unit 103 are 0°. In the present embodiment, a configuration is adopted such that a limit mark is displayed when the absolute value of the rotation angle of the pan unit 103 exceeds 30°. A dotted line 1802 in FIG. 12B and a dotted line 1803 in FIG. 12C indicate the image capture directions when the pan unit 103 rotates +30° and −30° from the initial position, respectively. Here, 30° is merely one example, and any angle smaller than the maximum rotation angle of the pan unit 103 can be set.

FIG. 12B illustrates an example of the field-of-view UI 601 in a state in which the rotation angle of the pan unit 103 to the right has exceeded 30° and is no greater than the maximum rotation angle. In this state, the control circuit 411 displays a limit mark 1804 at a position corresponding to the right edge of the maximum field of view displayed in a case in which the pan unit 103 reaches the maximum rotation angle to the right.

FIG. 12C illustrates an example of the field-of-view UI 601 in a state in which the rotation angle of the pan unit 103 to the left has exceeded 30° and is no greater than the maximum rotation angle. In this state, the control circuit 411 displays a limit mark 1805 at a position corresponding to the left edge of the maximum field of view displayed in a case in which the pan unit 103 reaches the maximum rotation angle to the left.

The limit mark 1804 may be realized by display in an emphasized state, or may be realized by display in an overlaid state for which a drawing circuit 1501 as described in the second embodiment is used. If display in an emphasized state is adopted, the control circuit 411 draws line segments in advance at positions at which the limit marks are to be displayed in the field-of-view UI 601. Furthermore, the control circuit 411 displays the line segments in the same color as that of the surroundings when not displaying the limit marks, and displays the line segments in an emphasized state when displaying the limit marks.

Figure 13:
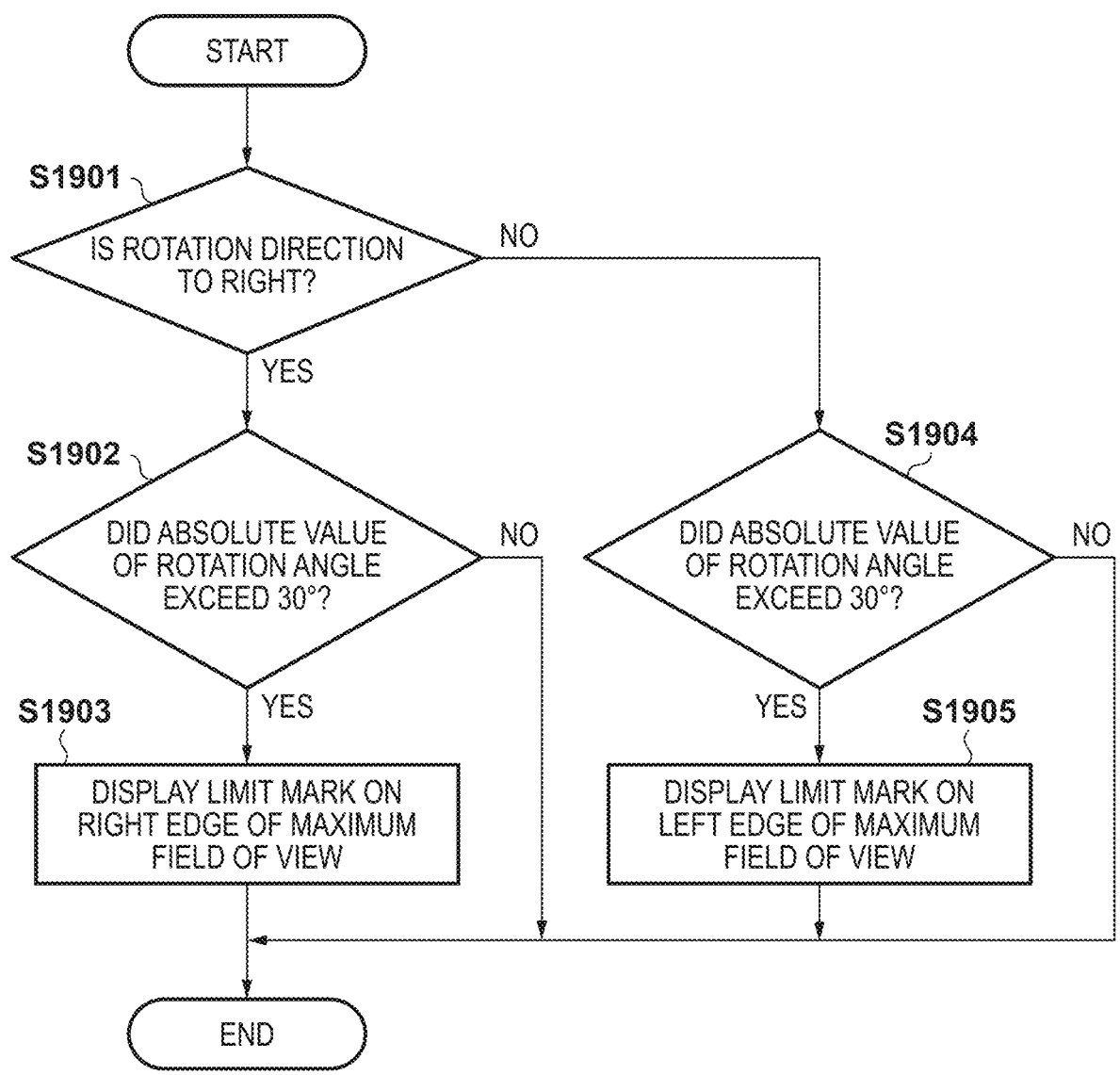
FIG. 13 is a flowchart relating to the processing for updating the field-of-view UI, pertaining to the third embodiment.

FIG. 13 is a flowchart of update processing of panning operation limit mark in the present embodiment. This processing can be performed in step S1007 in FIG. 5.

In step S1901, the control circuit 411 determines whether or not the current panning direction is to the right (clockwise), and advances processing to step S1902 if it is determined that the current panning direction is to the right and to step S1904 if it is not determined so. For example, the control circuit 411 can determine that the panning direction is to the right if the current pan unit rotation angle has the plus sign.

In step S1902, the control circuit 411 determines whether or not the absolute value of the rotation angle has exceeded 30°, and advances processing to step S1903 if it is determined that the absolute value has exceeded 30° and terminates processing if it is not determined so.

Also, in step S1904, the control circuit 411 determines whether or not the absolute value of the rotation angle has exceeded 30°, and advances processing to step S1905 if it is determined that the absolute value has exceeded 30° and terminates processing if it is not determined so.

In step S1903, the control circuit 411 displays the limit mark 1804 at a position corresponding to the right edge of the maximum field of view displayed in a case in which the pan unit 103 reaches the maximum rotation angle to the right, and terminates processing.

Also, in step S1905, the control circuit 411 displays the limit mark 1805 at a position corresponding to the left edge of the maximum field of view displayed in a case in which the pan unit 103 reaches the maximum rotation angle to the left, and terminates processing.

Note that processing can be similarly performed for the tilt unit using a UI similar to the field-of-view UI 601, for example.

According to the present embodiment, a limit mark is displayed from before a limit of an adjustable range of the maximum field of view is reached, and thus, the user can provide instructions for panning and tilting while checking the limit of the adjustable range. Note that the present embodiment can be implemented in combination with the limit mark display operations described in the first embodiment and the second embodiment.

Fourth Embodiment

Next, a fourth embodiment of the present invention will be described. In the present embodiment, a limit mark is displayed taking the installation state of the image capture apparatus 100 into consideration. The configurations of the image capture apparatus 100 and the smartphone 110 are the same as those in the first embodiment. Accordingly, the present embodiment will be described in the following focusing on the differences from the first embodiment.

Figure 14A:
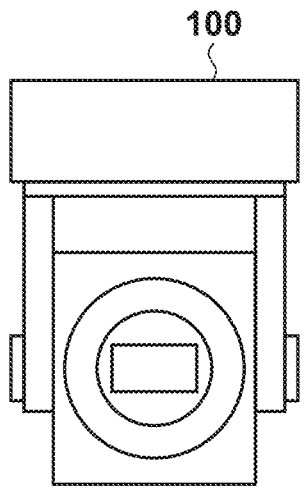
FIGS. 14A and 14B are schematic diagrams illustrating an example of a state in which an image capture apparatus is installed hanging down.
Figure 14B:
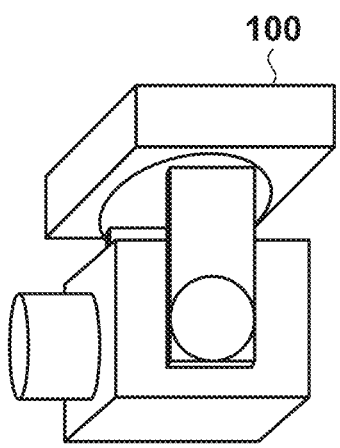

FIGS. 14A and 14B schematically illustrate a state in which the image capture apparatus 100 is installed hanging down from a ceiling, as one example of the installation state of the image capture apparatus 100. FIG. 14A illustrates an initial state, and FIG. 14B illustrates a state after panning by approximately 90° to the left is performed from the state in FIG. 14A.

Between a case in which the image capture apparatus is installed hanging down and the case illustrated in FIG. 1A, in which the image capture apparatus is installed on a stand, the top and bottom of the image capture apparatus are reversed, and thus, the relationship between the pan unit and tilt unit rotation directions and the change in the image capture direction is reversed. Accordingly, the remote control application includes settings for the individual installation states that are for displaying remote control screens corresponding to the installation states of the image capture apparatus 100. Note that there may be three or more installation states of the image capture apparatus, including two installation states as described for example here between which the top and bottom of the image capture apparatus are reversed.

The control circuit 411 acquires information regarding installation state when the communication with the image capture apparatus 100 is established. Alternatively, the control circuit 411 acquires an installation state of the image capture apparatus 100 set by the user via a setting screen of the remote control application. In the former case, the control circuit 307 of the image capture apparatus 100 can detect the installation state (for example, whether the installation state is normal installation (FIG. 1A) or installation in a hanging-down state (FIGS. 14A and 14B)) using an orientation sensor such as an acceleration sensor, and notify the smartphone 110 of the installation state.

The control circuit 411 displays a remote control screen corresponding to the installation state of the image capture apparatus 100. Specifically, if the image capture apparatus 100 is installed hanging down, the panning/tilting direction and the movement direction of the field of view and the maximum field of view in the field-of-view UI 601 are reversed with respect to one another.

Figure 15A:
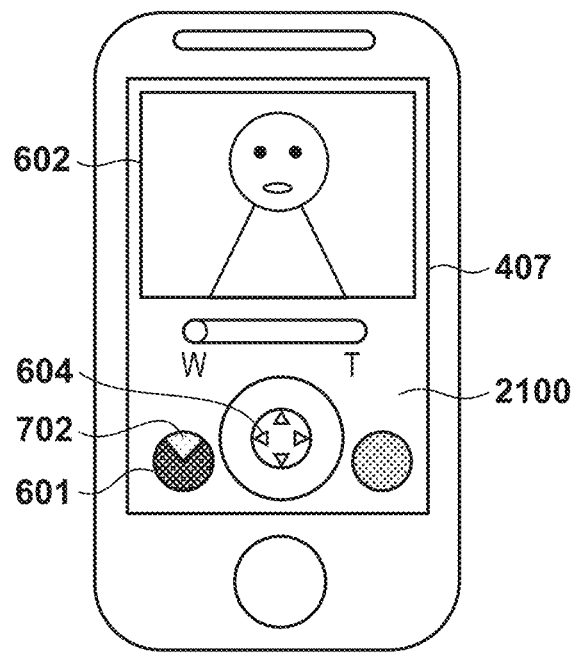
FIGS. 15A and 15B are diagrams illustrating examples of the remote control screen, pertaining to a fourth embodiment.
Figure 15B:
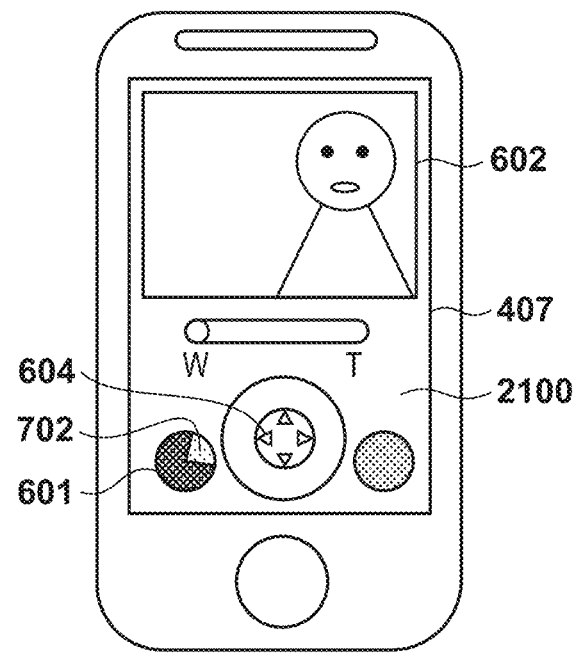

FIGS. 15A and 15B are diagrams illustrating examples of the remote control screen displayed by the control circuit 411 in a case in which the image capture apparatus 100 is installed hanging down in the present embodiment. The constituent elements included in a remote control screen 2100 are similar to those in the first embodiment, and description thereof is thus omitted.

FIG. 15A illustrates an example, corresponding to FIG. 14A, of the remote control screen 2100 in the initial state of the image capture apparatus 100. The control circuit 411 aligns the top and bottom of a captured image received from the image capture apparatus 100 with the top and bottom of the remote control screen 2100 by displaying the captured image in the image area 602 in a state in which the captured image is rotated 180°. In addition, the control circuit 411 displays the indication of the field of view 702 in the field-of-view UI 601 so that the image capture direction faces the front.

FIG. 15B illustrates an example of the remote control screen 2100 in a case in which the pan/tilt UI 604 has been operated and an instruction for a panning operation to the left has been provided in this state. If the installation state were normal, the indication of the field of view 702 in the field-of-view UI 601 would move to the left in response to the panning to the left. However, since the image capture apparatus 100 is installed hanging down here, the control circuit 411 moves the indication of the field of view 702 in the field-of-view UI 601 to the right in response to the panning to the left. Note that the indication of the maximum field of view is also controlled similarly to the indication of the field of view.

According to the present embodiment, the installation state of the image capture apparatus 100 is reflected in the indication of the field of view and the maximum field of view in the field-of-view UI. Specifically, the relationship between the direction in which the image capture direction changes and the direction in which the display position of the field of view and the maximum field of view changes is varied depending on the installation state of the image capture apparatus. Accordingly, the user can easily adjust the field of view to the desired direction even if remotely controlling an image capture apparatus that can be installed in a state such that the panning direction and the image capture direction are reversed with respect to one another, for example. In addition, the present embodiment can be implemented in combination with one or more of the first to third embodiments described above. In such a case, the effects of the respective embodiments can also be realized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-158935, filed on Aug. 30, 2019, which is hereby incorporated by reference herein in its entirety.

What is claimed is:

1. An electronic device that displays an operation screen for remotely adjusting a field of view (FOV) of an image capture apparatus with which the electronic device can communicate, wherein
the operation screen comprises a field-of-view user interface (FOV-UI) that includes an indication of a current field of view of the image capture apparatus and an indication of a maximum field of view at a current orientation of the image capture apparatus, and
the electronic device comprises one or more processors that execute a program stored in a memory and, when executing the program, function as:
a control unit configured to update the FOV-UI based on information acquired from the image capture apparatus,
wherein the field-of-view user interface (FOV-UI) indicates both the indication of a current field of view of the image capture apparatus and the indication of a maximum field of view at a current orientation of the image capture apparatus at once.

2. The electronic device according to claim 1, wherein the control unit changes a size of the indication of the current field of view in the FOV-UI in accordance with a zoom magnification of the image capture apparatus.

3. The electronic device according to claim 1, wherein the control unit changes display positions, in the FOV-UI, of the indication of the current field of view and the indication of the maximum field of view, in accordance with a change of the orientation of the image capture apparatus.

4. The electronic device according to claim 3, wherein the control unit varies a relationship between a direction in which the orientation changes and a direction in which the display positions are changed depending on an installation state of the image capture apparatus.

5. The electronic device according to claim 4, wherein the installation state includes two installation states in which the top and bottom of the image capture apparatus in one of the two installation states are reversed in the other.

6. The electronic device according to claim 1, wherein
the operation screen further comprises a direction instructing UI for changing the orientation of the image capture apparatus, and
the control unit displays, on the FOV-UI, a mark indicating a maximum field of view when the orientation of the image capture apparatus is maximally changed from an initial state via the direction instructing UI.

7. The electronic device according to claim 6, wherein the control unit displays the mark when an instruction to change the orientation in a first direction is provided via the direction instructing UI in a state in which the orientation has been maximally changed in the first direction from the initial state.

8. The electronic device according to claim 6, wherein the control unit displays the mark in a state in which a change amount of the orientation in a first direction from the initial state exceeds a predetermined amount.

9. The electronic device according to claim 6, wherein the control unit displays the mark on an edge of the maximum field of view corresponding to a case in which the orientation of the image capture apparatus is maximally changed from the initial state via the direction instructing UI.

10. The electronic device according to claim 1, wherein
the operation screen further comprises a direction instructing UI for changing the orientation of the image capture apparatus and an image area that displays an image captured by the image capture apparatus, and
the control unit displays a predetermined mark being overlaid on an edge of the image displayed in the image area when an instruction to change the orientation of the image capture apparatus in a first direction is provided via the direction instructing UI in a state in which the orientation of the image capture apparatus has maximally been changed in the first direction from an initial state.

11. The electronic device according to claim 10, wherein, when an instruction to change the orientation of the image capture apparatus in the first direction is provided via the direction instructing UI in the state in which the orientation of the image capture apparatus has maximally been changed in the first direction from the initial state, the control unit further displays, in the FOV-UI, a mark indicating the maximum field of view corresponding to a case in which the orientation of the image capture apparatus is maximally changed from the initial state.

12. A control method for an electronic device that displays an operation screen for remotely adjusting a field of view (FOV) of an image capture apparatus with which the electronic device can communicate, wherein
the operation screen comprises a field-of-view user interface (FOV-UI) that includes an indication of a current field of view of the image capture apparatus and an indication of a maximum field of view at a current orientation of the image capture apparatus, and
the control method comprises updating display of the FOV-UI based on information acquired from the image capture apparatus,
wherein the field-of-view user interface (FOV-UI) indicates both the indication of a current field of view of the image capture apparatus and the indication of a maximum field of view at a current orientation of the image capture apparatus at once.

13. A non-transitory computer-readable medium storing a program that causes, when executable by a processor, the processor to function as:
a control unit configured to:
display an operation screen for remotely adjusting a field of view (FOV) of an image capture apparatus with which the electronic device can communicate, on a display device, wherein the operation screen comprises a field-of-view user interface (FOV-UI) that includes an indication of a current field of view of the image capture apparatus and an indication of a maximum field of view at a current orientation of the image capture apparatus; and
update the FOV-UI based on information acquired from the image capture apparatus,
wherein the field-of-view user interface (FOV-UI) indicates both the indication of a current field of view of the image capture apparatus and the indication of a maximum field of view at a current orientation of the image capture apparatus at once.

* * * * *